(12) United States Patent
Moehrle et al.

(10) Patent No.: US 12,149,805 B2
(45) Date of Patent: Nov. 19, 2024

(54) METHOD FOR MANUFACTURING A CAMERA MODULE

(71) Applicant: Robert Bosch GmbH, Stuttgart (DE)

(72) Inventors: Andreas Moehrle, Stuttgart (DE); Johannes Eschler, Weil der Stadt (DE); Moritz Winkler, Waldbronn (DE); Nikolai Bauer, Moeglingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 135 days.

(21) Appl. No.: 17/763,788

(22) PCT Filed: Sep. 16, 2020

(86) PCT No.: PCT/EP2020/075794
§ 371 (c)(1),
(2) Date: Mar. 25, 2022

(87) PCT Pub. No.: WO2021/063673
PCT Pub. Date: Apr. 8, 2021

(65) Prior Publication Data
US 2022/0353399 A1     Nov. 3, 2022

(30) Foreign Application Priority Data

Oct. 2, 2019 (DE) ..................... 10 2019 215 187.6

(51) Int. Cl.
*H04N 23/52* (2023.01)
*H04N 23/54* (2023.01)
*H04N 23/55* (2023.01)

(52) U.S. Cl.
CPC ............. *H04N 23/52* (2023.01); *H04N 23/54* (2023.01); *H04N 23/55* (2023.01)

(58) Field of Classification Search
None
See application file for complete search history.

(56) References Cited

U.S. PATENT DOCUMENTS 10,835,006 B2 * 11/2020 Martinez ................ G03B 17/08
11,096,301 B2 *  8/2021 Mai ......................... G01S 7/028
(Continued)

FOREIGN PATENT DOCUMENTS

| | | |
|---|---|---|
| EP | 2054270 B1 | 12/2012 |
| WO | 2007124994 A1 | 11/2007 |
| WO | 2013103548 A1 | 7/2013 |

OTHER PUBLICATIONS

International Search Report for PCT/EP2020/075794, Issued Nov. 26, 2020.
Wikipedia Article on Holga Fig on, 2020, pp. 1-10.

*Primary Examiner* — James M Hannett
(74) *Attorney, Agent, or Firm* — NORTON ROSE FULBRIGHT US LLP; Gerard A. Messina

(57) ABSTRACT

A method for joining a camera module, including a base plate on which an image sensor is situated, and an objective mount in which an objective of the camera module is accommodated. The base plate is placed on the objective mount, and at least one spring element is laterally mounted and positioned at each of at least two connection areas that are oppositely situated with respect to the optical axis of the camera module. The base plate and the objective mount are pressed flatly against one another via the spring element.

11 Claims, 2 Drawing Sheets

(56) References Cited

U.S. PATENT DOCUMENTS

| | | | |
|---|---|---|---|
| 2004/0047050 A1* | 3/2004 | Bauer | H01L 27/14618 257/E31.118 |
| 2006/0222300 A1 | 10/2006 | Frenzel et al. | |
| 2014/0354878 A1* | 12/2014 | Winter | H04N 23/55 348/374 |
| 2015/0146094 A1 | 5/2015 | Seger et al. | |
| 2019/0293896 A1* | 9/2019 | Bozkaya | H04N 23/54 |
| 2022/0004085 A1* | 1/2022 | Shabtay | G02B 7/04 |

* cited by examiner

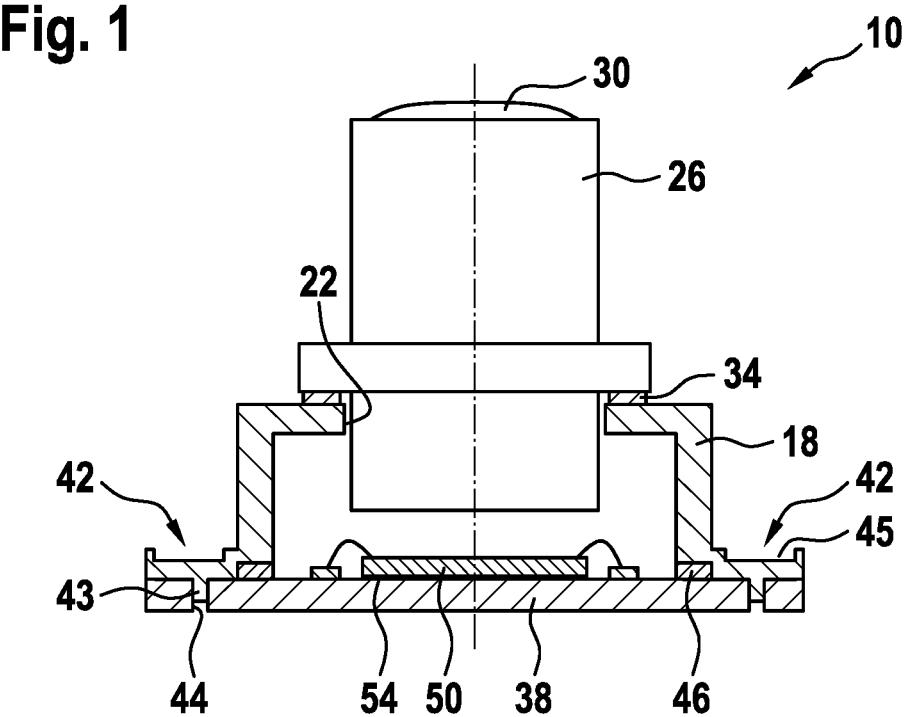
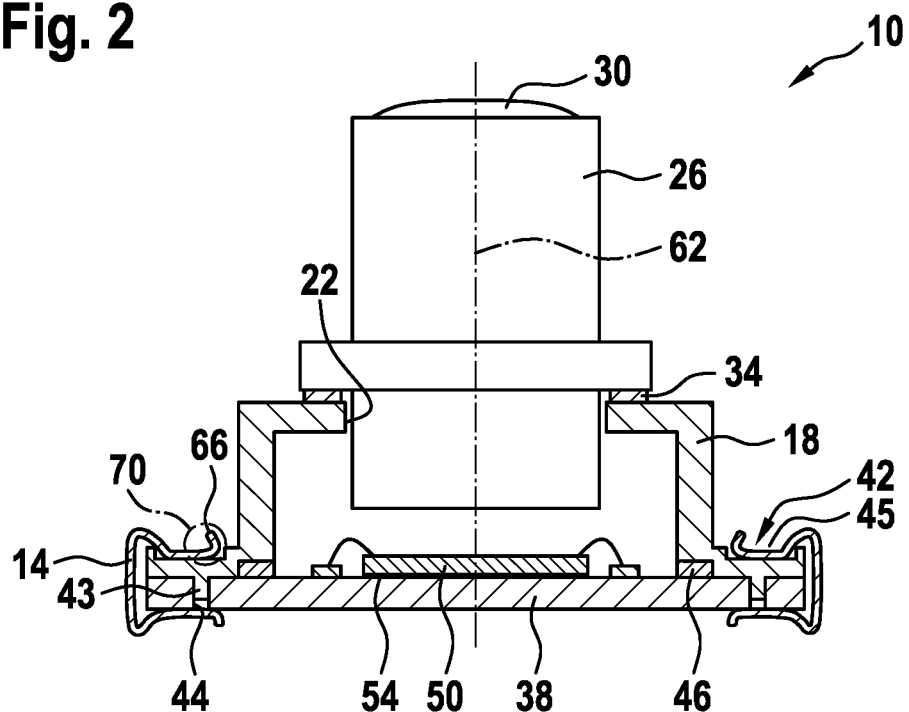

METHOD FOR MANUFACTURING A CAMERA MODULE

FIELD

The present invention relates to a camera module and a method for manufacturing such a camera module.

BACKGROUND INFORMATION

In camera modules, the interface between the printed circuit board of the image sensor and the objective mount/housing is usually joined together by adhesive bonding, screwing, or caulking. In addition, methods such as welding or soldering are occasionally used to establish an integrally bonded connection.

European Patent No. EP 2 054 270 B1 describes a camera system for a surroundings detection system of a vehicle. The camera system includes optics and an optics carrier that aligns the optics. In addition, a printed circuit board including an image sensor is described, it being possible to provide a spring means via which the printed circuit board is pressed against the optics carrier.

An object of the present invention is to provide a space-optimized connection between the printed circuit board and the objective mount/housing with good heat conduction and holding properties. This object may be achieved by the present invention. Preferred specific example embodiments are disclosed herein.

SUMMARY

The present invention provides a method for joining a camera module, including a base plate on which an image sensor is situated, and an objective mount in which an objective of the camera module is accommodated. In accordance with an example embodiment of the present invention, the base plate is placed on the objective mount, and at least one spring element is laterally mounted and positioned at each of at least two connection areas that are oppositely situated with respect to the optical axis of the camera module, via which spring element the base plate and the objective mount are pressed flatly against one another.

A spring element is understood to mean any element with which the base plate and the objective mount may be pressed against one another via an elastic force. To achieve a sufficient connection of the base plate to the objective mount, at least two spring elements situated at two opposite connection areas are used. A connection area is understood to mean the area in which the base plate and the objective mount rest against one another, and in which the spring element applies a contact force to both. Positioning pins via which the base plate and the objective mount may be aligned with one another are preferably provided for the positioning.

In one preferred embodiment of the present invention, the positioning pins protrude through the base plate so that they engage with a corresponding opening in the spring element. The spring element is thus fixed to the positioning pin. The opening in the spring element may be designed as an elongated hole. In a further advantageous embodiment, a corresponding pin with which the spring element is engaged may be situated on a side of the objective mount opposite from the positioning pin.

Compared to welding, for example, such a connection between the base plate and the objective mount may be established more quickly and cost-effectively. Furthermore, it is not necessary, as with a screw connection, to provide an additional screw-in depth for the required thread length. Such a camera module may thus have a smaller design, so that installation space is saved. This is advantageous in particular due to the limited assembly space in such a camera module.

Compared to an adhesive bond, an adhesive layer between the base plate and the objective mount is also not necessary. Such an adhesive layer decreases the heat conduction between the base plate and the objective mount. In contrast, according to the present invention the base plate and the objective mount rest flatly and directly against one another, so that the heat conduction is significantly improved. A space-optimized camera module having long durability and good heat conduction is thus provided due to the connection of the base plate and the objective mount by use of the spring element.

In one preferred embodiment of the present invention, a seal is provided in the connection area between the base plate and the objective mount prior to mounting the spring element. The interior of the camera module may be better protected from external influences by such a seal. The seal is advantageously situated in a groove in the base plate or in the objective mount.

In a further preferred embodiment of the present invention, the spring element is mounted in such a way that a force introduction point of the spring element is situated at the seal. The force introduction point is the specific position within the connection area in which the force of the spring element acts directly on the base plate or the objective mount. Due to the appropriate arrangement of the seal, the elastic force thus also acts directly on the seal, thereby improving the sealing effect of the seal.

Alternatively, the spring element is mounted in such a way that a force introduction point of the spring element is situated between the seal and the optical axis of the camera module. A force of the seal which counteracts the compression, and the elastic force are thus spaced apart from one another, and act oppositely on the base plate from two different sides. This results overall in a bending moment, which manifests as a convex deflection of the base plate. This deflection has the advantage that it is used as compensation for a possible deflection of the base plate due to the influence of temperature and moisture. It is thus likewise possible to compensate for linear expansions of other components such as the objective or the objective mount.

In a further advantageous alternative, the spring element is mounted in such a way that the seal is situated between the force introduction point of the spring element and the optical axis of the camera module. Such an arrangement correspondingly results in a concave deflection of the base plate. Deflections and expansions may also be compensated for in this way.

In a further advantageous embodiment of the present invention, prior to mounting the spring element in the connection area at the base plate and/or the objective mount, an indentation is formed via which the spring element is fixed in the connection area. The indentation is preferably delimited with respect to an outer edge of the camera module, so that unintentional detachment of the spring element is avoided. A secure connection between the base plate and the objective mount may be permanently ensured in this way.

In addition, the present invention provides a camera module that is manufactured using the method according to the present invention. The camera module includes a base plate on which an image sensor is situated, and an objective mount in which an objective of the camera module is accommodated, the base plate and the objective mount being connected to one another via at least two spring elements that are situated in a respective connection area, at opposite sides with respect to the optical axis of the camera module. Such a camera module has the advantages described above.

According to one advantageous embodiment of the present invention, the spring element is designed as a C-shaped contour. The C-shaped contour of the spring element has an open side via which the spring element is mountable, via outer sides, on the camera module for fastening. Simple installation of the spring elements is thus appropriately ensured.

According to a further advantageous embodiment of the present invention, at an open side of the contour the spring element includes an insertion area that widens with respect to the edge of the spring element. A widening insertion area is understood to mean an area that geometrically tapers from an insertion direction of the connection area of the camera module relative to the spring element, up to a section at which the elastic force is applied to the connection area. In particular, mounting of the spring element on the connection area is simplified due to the widened insertion area.

The spring element is advantageously made of a metallic material or a plastic material. The metallic material may be produced in a particularly cost-effective manner, and a high elastic force may be applied by use of this material. Sheet metal is preferably used as the metallic material, so that the material costs may also be reduced. In contrast, the plastic material is lightweight and generally less expensive than metallic materials. Accordingly, a more lightweight spring element may be provided.

Moreover, the present invention provides a camera system that includes such a camera module. The above-mentioned advantages are achieved using such a camera system.

Exemplary embodiments of the present invention are illustrated in the figures and explained in greater detail in the following description.

BRIEF DESCRIPTION OF THE DRAWINGS

FIG. 1 shows a first exemplary embodiment of a camera module prior to mounting a spring element, in accordance with the present invention.

FIG. 2 shows the exemplary embodiment according to FIG. 1 after mounting a spring element, in accordance with the present invention.

DETAILED DESCRIPTION OF EXAMPLE EMBODIMENTS

Figure 3:
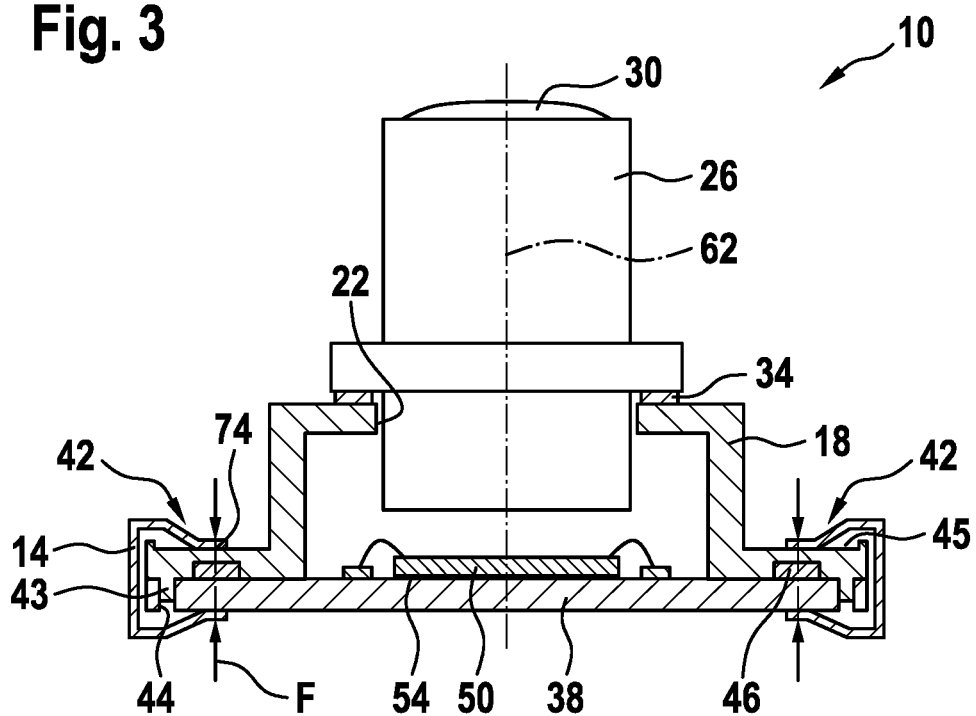
FIG. 3 shows a second exemplary embodiment of a camera module, in accordance with the present invention.

FIG. 1 shows a first exemplary embodiment of a camera module 10 prior to mounting a spring element 14 (see FIG. 2, for example). Camera module 10 includes an objective mount 18, in which an objective 26 together with a lens 30 is accommodated in a cutout 22. Objective 26 is fastened to objective mount 18 via an adhesive 34 that is applied between objective mount 18 and objective 26.

Camera module 10 additionally includes a base plate 38 that rests flatly against objective mount 18 in a connection area 42. Base plate 38 is positionable with respect to objective mount 18 via positioning pins 43 of objective mount 18 that engage with corresponding recesses 44 in base plate 38. In this exemplary embodiment, objective mount 18 has an indentation 45, which in this exemplary embodiment is delimited on both sides, in connection area 42 on an outer side.

To protect the interior of camera module 10 from environmental influences, a seal 46 which in this exemplary embodiment directly adjoins connection area 42 is situated between objective mount 18 and base plate 38. An image sensor 50, which is joined to base plate 38 via an adhesive layer 54, is situated on base plate 38. Image sensor 50 is situated in flush alignment with objective 26.

FIG. 2 shows the exemplary embodiment according to FIG. 1 after mounting spring element 14. Base plate 38 and objective mount 18 are pressed against one another via this spring element 14. During mounting of C-shaped spring element 14, on the edge side it is pushed on at two opposite sides with respect to an optical axis 62 of objective 26. In this exemplary embodiment, for easier mounting of spring element 14, at an open side of the C-shaped contour the spring element includes an insertion area 70 that widens with respect to spring element edge 66. After mounting, spring element 14 is fixed by indentation 45, as shown in FIG. 2, so that spring element 14 is prevented from sliding out.

In an exemplary embodiment that is not shown, positioning pin 43 may be extended in such a way that it protrudes into an opening in spring element 14 so that spring element 14 is fixed. Likewise, in addition a further pin may be provided that is situated on a side of objective mount 18 opposite from positioning pin 43, the further pin likewise engaging with a corresponding opening in spring element 14.

A second exemplary embodiment of a camera module 10 is shown in FIG. 3. This exemplary embodiment differs from the exemplary embodiment shown in FIG. 2 in that spring element 14 does not include an insertion area 70. In addition, seal 46 is situated within connection area 42 directly in the area of a force introduction point 74 of spring element 14. Elastic force F is thus transmitted directly to seal 46, thereby improving the sealing effect of seal 46.

Figure 4:
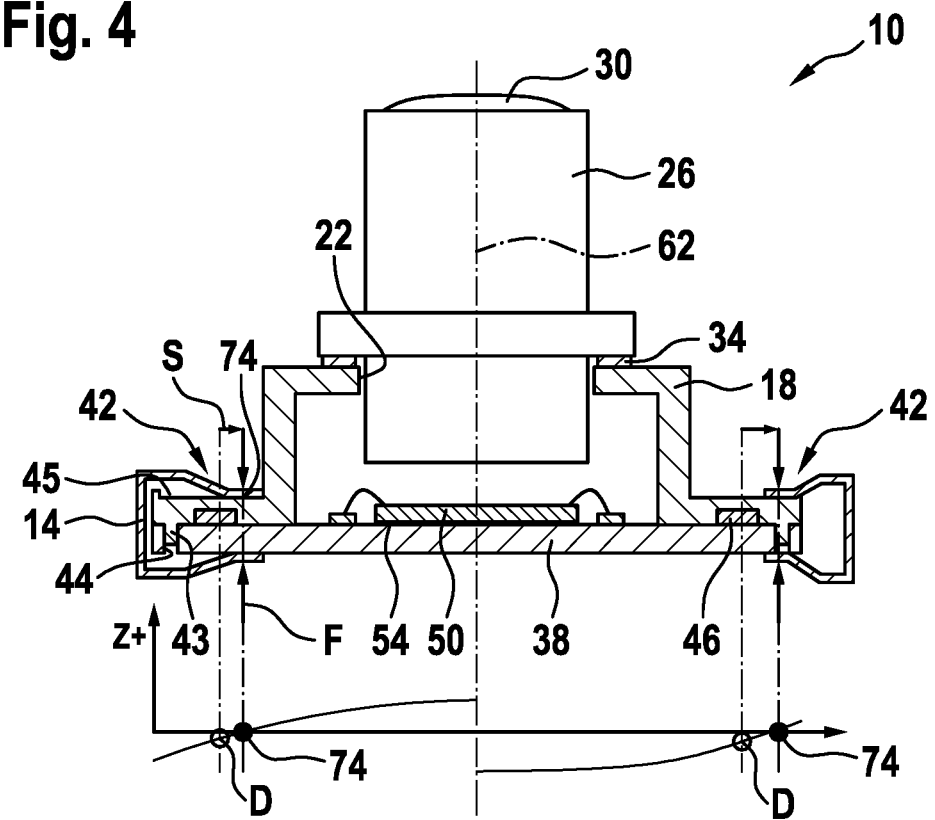
FIG. 4 shows third and fourth exemplary embodiments of a camera module, in accordance with the present invention.

FIG. 4 shows third and fourth exemplary embodiments of camera module 10. The third exemplary embodiment is shown on the left side of camera module 10, while the right side of camera module 10 is provided as the fourth exemplary embodiment. In contrast to FIG. 3, on the left side a force introduction point 74 of spring element 14 is situated between optical axis 62 and seal 46, not directly at seal 46. Force introduction point 74 thus has a distance S from seal 46.

In this exemplary embodiment, seal 46 may be designed in such a way that it protrudes beyond objective mount 18 in a contact area with respect to base plate 38, even after an elastic force F is applied. As the result of an arrangement of spring element 14 as illustrated in the left portion of camera module 10, plate 38 is bent by elastic force F in the direction of objective 26 about a pivot point D that is formed by seal 46. Accordingly, this results in convex bending of base plate 38. A corresponding illustration of the resulting deflection, base plate 38, and force introduction point 74 as well as pivot point D is shown in the graphical illustration below camera module 10. For example, bending of base plate 38 due to temperature or moisture may be compensated for by such a deflection.

In the right portion of camera module 10, spring element 14 is arranged in such a way that seal 46 is situated between force introduction point 74 and optical axis 62. Accordingly, base plate 38, as shown in the graphical illustration, is bent away from objective 26, resulting in concave bending of base plate 38. Bending of base plate 38 may also be compensated for in this way.

What is claimed is:

1. A method for joining a camera module, the method comprising:
    placing a base plate on an objective mount, wherein the camera module includes the base plate on which an image sensor is situated, and the objective mount in which an objective of the camera module is accommodated; and
    laterally mounting and positioning at least one spring element at each of at least two connection areas, including a first connection area and a second connection area, that are oppositely situated with respect to an optical axis of the camera module, the base plate and the objective mount being pressed flatly against one another via the spring elements;
    wherein the base plate is a flat planar plate that bears the image sensor, and
    wherein a respective bottom portion of each of the spring elements contacts a respective bottom surface of the base plate, and a respective top portion of each of the spring elements contacts a respective connection area of the objective mount, each of the respective connection areas being a respective flange section of the objective mount.

2. The method as recited in claim 1, wherein a seal is in the connection areas between the base plate and the objective mount prior to mounting each of the spring elements.

3. The method as recited in claim 2, wherein each of the spring elements is mounted so that a force introduction point of each of the spring elements is situated at the seal.

4. The method as recited in claim 2, wherein each of the spring elements is mounted so that a force introduction point of each of the spring elements is situated between the seal and the optical axis of the camera module.

5. The method as recited in claim 2, wherein each of the spring elements is mounted so that the seal is situated between a force introduction point of each of the spring elements and the optical axis of the camera module.

6. The method as recited in claim 1, wherein prior to mounting each of the spring elements in the connection areas at the base plate and/or the objective mount, an indentation is formed via which each of the spring elements is fixed in respective one of the connection areas.

7. A camera module, comprising:
    a base plate on which an image sensor is situated; and
    an objective mount in which an objective of the camera module is accommodated;
    wherein the base plate and the objective mount are connected to one another via at least two spring elements, including a first spring and a second spring, that are respectively situated in a first connection area and a second connection area of the objective mount, at opposite sides with respect to an optical axis of the camera module;
    wherein the base plate is a flat planar plate that bears the image sensor,
    wherein a first bottom portion of the first spring contacts a first bottom surface of the base plate, and a top portion of the first spring contacts the first connection area of the objective mount, the first connection area being a first flange section of the objective mount, and
    wherein a second bottom portion of the second spring contacts a second bottom surface of the base plate, and a top portion of the second spring contacts the second connection area of the objective mount, the second connection area being a second flange section of the objective mount.

8. The camera module as recited in claim 7, wherein each of the spring elements has a C-shaped contour.

9. The camera module as recited in claim 8, wherein at an open side of the contour each of the spring elements includes an insertion area that widens with respect to a spring element edge.

10. The camera module as recited in claim 7, wherein each of the spring elements is made of a metallic material or a plastic material.

11. A camera system, comprising:
    a camera module, including:
        a base plate on which an image sensor is situated, and
        an objective mount in which an objective of the camera module is accommodated;
    wherein the base plate and the objective mount are connected to one another via at least two spring elements, including a first spring and a second spring, that are situated in a first connection area and a second connection area of the objective mount, at opposite sides with respect to an optical axis of the camera module;
    wherein the base plate is a flat planar plate that bears the image sensor,
    wherein a first bottom portion of the first spring contacts a first bottom surface of the base plate, and a top portion of the first spring contacts the first connection area of the objective mount, the first connection area being a first flange section of the objective mount, and
    wherein a second bottom portion of the second spring contacts a second bottom surface of the base plate, and a top portion of the second spring contacts the second connection area of the objective mount, the second connection area being a second flange section of the objective mount.

* * * * *